US012254455B2

(12) United States Patent
Andronic et al.

(10) Patent No.: US 12,254,455 B2
(45) Date of Patent: *Mar. 18, 2025

(54) SELF-CHECKOUT STORE

(71) Applicant: Bizerba SE & Co. KG, Balingen (DE)

(72) Inventors: Tudor Andronic, Matzingen (CH); Meik Huber, Muehlheim (DE)

(73) Assignee: BIZERBA SE & CO. KG, Balingen (DE)

(*) Notice: Subject to any disclaimer, the term of this patent is extended or adjusted under 35 U.S.C. 154(b) by 0 days.

This patent is subject to a terminal disclaimer.

(21) Appl. No.: 18/403,767

(22) Filed: Jan. 4, 2024

(65) Prior Publication Data
US 2024/0144218 A1 May 2, 2024

Related U.S. Application Data

(63) Continuation of application No. 17/551,207, filed on Dec. 15, 2021, now Pat. No. 11,900,349.

(30) Foreign Application Priority Data

Dec. 27, 2020 (EP) ..................................... 20217325

(51) Int. Cl.
*G06Q 20/18* (2012.01)
*G06Q 20/20* (2012.01)

(52) U.S. Cl.
CPC ........... *G06Q 20/18* (2013.01); *G06Q 20/208* (2013.01)

(58) Field of Classification Search
CPC .... G06Q 30/0633; G06Q 20/12; G06Q 20/18; G06Q 20/208; G01G 19/4144;

(Continued)

(56) References Cited

U.S. PATENT DOCUMENTS

| 7,780,081 B1 | 8/2010 | Liang |
| 10,520,353 B1 | 12/2019 | Shi et al. |

(Continued)

FOREIGN PATENT DOCUMENTS

| EP | 1717772 A1 | 11/2006 |
| EP | 3654305 A1 | 5/2020 |

(Continued)

OTHER PUBLICATIONS

Wankhede, Kirti, Bharati Wukkadada, and Vidhya Nadar. "Just walk-out technology and its challenges: A case of Amazon Go." 2018 International Conference on Inventive Research in Computing Applications (ICIRCA). IEEE, 2018. (Year: 2018).

(Continued)

*Primary Examiner* — Nathan A Mitchell
(74) *Attorney, Agent, or Firm* — LEYDIG, VOIT & MAYER, LTD.

(57) ABSTRACT

A method operates a sales device for goods. The method includes: detecting, using a shelf with automatic removal monitoring, a removed item and determining item data of the removed item; reading out a customer identification number of a customer in a vicinity of the shelf from which the removed item has been removed; receiving, by a controller, the item data of the removed item and the customer identification number; adding, with the controller, the item data of the removed item and the customer identification number to a list of items intended for payment; and detecting, with a detector, items for which a payment transaction is to be executed. The detector has at least one sensor and an evaluator and for detecting articles, at least the data of the sensor and the list of items intended for payment are being made available to the evaluator as input variables.

13 Claims, 7 Drawing Sheets

(58) Field of Classification Search
CPC ...... G01G 19/52; A47F 9/048; G07G 1/0072; G07G 1/14
See application file for complete search history.

(56) References Cited

U.S. PATENT DOCUMENTS

| | | | |
|---|---|---|---|
| 10,540,700 B1 | 1/2020 | Chilukuri | |
| 10,607,080 B1 | 3/2020 | Mirza et al. | |
| 11,023,728 B1 | 6/2021 | Wang et al. | |
| 11,042,836 B1* | 6/2021 | Goldstein | G06Q 10/087 |
| 11,049,170 B1* | 6/2021 | Francis | G07G 1/0036 |
| 11,068,962 B1* | 7/2021 | Grigsby | H04N 7/181 |
| 11,132,737 B2 | 9/2021 | Glaser et al. | |
| 11,195,140 B1* | 12/2021 | Munger | G07G 1/0072 |
| 11,301,984 B1* | 4/2022 | Kumar | G06T 7/0008 |
| 11,443,275 B1* | 9/2022 | Prakash | G07G 1/0081 |
| 2012/0284132 A1 | 11/2012 | Kim et al. | |
| 2013/0284806 A1 | 10/2013 | Margalit | |
| 2014/0052555 A1 | 2/2014 | MacIntosh | |
| 2015/0039458 A1 | 2/2015 | Reid | |
| 2016/0189277 A1* | 6/2016 | Davis | H04N 7/181 705/26.8 |
| 2017/0083887 A1* | 3/2017 | Volta | G06Q 20/203 |
| 2017/0158215 A1* | 6/2017 | Phillips | B62B 5/0096 |
| 2017/0169440 A1* | 6/2017 | Dey | H04W 4/021 |
| 2018/0096566 A1* | 4/2018 | Blair, II | G06Q 20/209 |
| 2018/0114184 A1 | 4/2018 | Brooks et al. | |
| 2018/0232796 A1 | 8/2018 | Glaser et al. | |
| 2018/0240180 A1* | 8/2018 | Glaser | G07G 1/0081 |
| 2018/0373928 A1 | 12/2018 | Glaser et al. | |
| 2019/0026593 A1* | 1/2019 | Sawada | G06V 20/52 |
| 2019/0108396 A1 | 4/2019 | Dal Mutto et al. | |
| 2019/0147709 A1 | 5/2019 | Schoner | |
| 2019/0164142 A1* | 5/2019 | Scott | G06Q 20/208 |
| 2019/0236583 A1* | 8/2019 | Hagen | G06Q 20/047 |
| 2019/0325367 A1* | 10/2019 | Tovey | G06Q 20/3274 |
| 2020/0034812 A1* | 1/2020 | Nemati | G06Q 20/14 |
| 2020/0151696 A1* | 5/2020 | Plocher | G07G 1/0036 |
| 2020/0286058 A1 | 9/2020 | Edwards et al. | |
| 2020/0402139 A1* | 12/2020 | Higa | G06Q 20/201 |
| 2021/0182922 A1* | 6/2021 | Zheng | H04N 23/69 |
| 2021/0196059 A1 | 7/2021 | Fritsch et al. | |
| 2021/0342807 A1 | 11/2021 | Meidar et al. | |
| 2021/0407131 A1* | 12/2021 | Kallakuri | G06V 20/52 |
| 2022/0067644 A1 | 3/2022 | Drissner | |
| 2022/0067689 A1* | 3/2022 | Guack | G06T 7/251 |
| 2022/0114868 A1* | 4/2022 | Bronicki | G06V 10/765 |
| 2022/0198550 A1 | 6/2022 | Meidar et al. | |

FOREIGN PATENT DOCUMENTS

| | | |
|---|---|---|
| EP | 3620760 B1 | 11/2020 |
| EP | 3845874 A1 | 7/2021 |

OTHER PUBLICATIONS

Chi, Hong-Chuan, et al. "Smart self-checkout carts based on deep learning for shopping activity recognition." 2020 21st Asia-Pacific Network Operations and Management Symposium (APNOMS). IEEE, 2020. (Year: 2020).

* cited by examiner

SELF-CHECKOUT STORE

CROSS REFERENCE TO RELATED APPLICATIONS

This application is a continuation of U.S. application Ser. No. 17/551,207, filed on Dec. 15, 2021, which claims benefit to European Patent Application No. 20 217 325.8, filed on Dec. 27, 2020, the entire contents of each of which are hereby incorporated by reference herein.

FIELD

The present invention relates to a method for operating a sales device for goods, in particular retail goods, and to a sales device for self-checkout of goods, in particular retail goods.

BACKGROUND

A device for operator-free sale—in particular, for operator-free billing in supermarkets—is disclosed in EP1717772A1, for example. It offers a system in which the customer brings places products in a shopping cart in the supermarket as usual. When walking through the supermarket, the customer scans each product they place into the shopping cart. At the checkout, the information about the scanned products is transmitted from the scanner to a billing terminal. The customer can then pay their purchase. In order to be able to indicate errors in the scanning process, different verification methods are provided at the checkout, e.g., based on optical methods or weight detection methods. In this method, parts of the operator's tasks, namely the manual scanning of each individual item, must be carried out by the customer. The present inventors have recognized that this is unfamiliar and inconvenient for the customer. In addition, the present inventors have further recognized that this method is prone to errors because the customer has to scan every single item before adding it to the shopping cart. In the event of deviations between the items in the shopping cart and the scanned items, this must be corrected at checkout. Sales personnel are required for this purpose. This system cannot be used as an operator-free system in 24-hour operation.

Shelving systems with integrated inventory monitoring are discussed in EP3620760B1. A previously unpublished European patent application EP19220148.1 of the applicant shows a further variant of a shelving system with integrated inventory monitoring. Goods are offered to a customer for removal on a support surface. A weight determination is used to determine from which position a product was removed from the support surface. Inventory monitoring is continuously updated with the information about the removed goods.

SUMMARY

In an embodiment, the present disclosure provides a method for operating a sales device for goods. The method includes: detecting, using a shelf with automatic removal monitoring, a removed item and determining item data of the removed item; reading out a customer identification number of a customer in a vicinity of the shelf from which the removed item has been removed; receiving, by a controller, the item data of the removed item and the customer identification number; adding, with the controller, the item data of the removed item and the customer identification number to a list of items intended for payment; and detecting, with a detector, items for which a payment transaction is to be executed. The detector has at least one sensor and an evaluator and for detecting articles, at least the data of the sensor and the list of items intended for payment are being made available to the evaluator as input variables.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
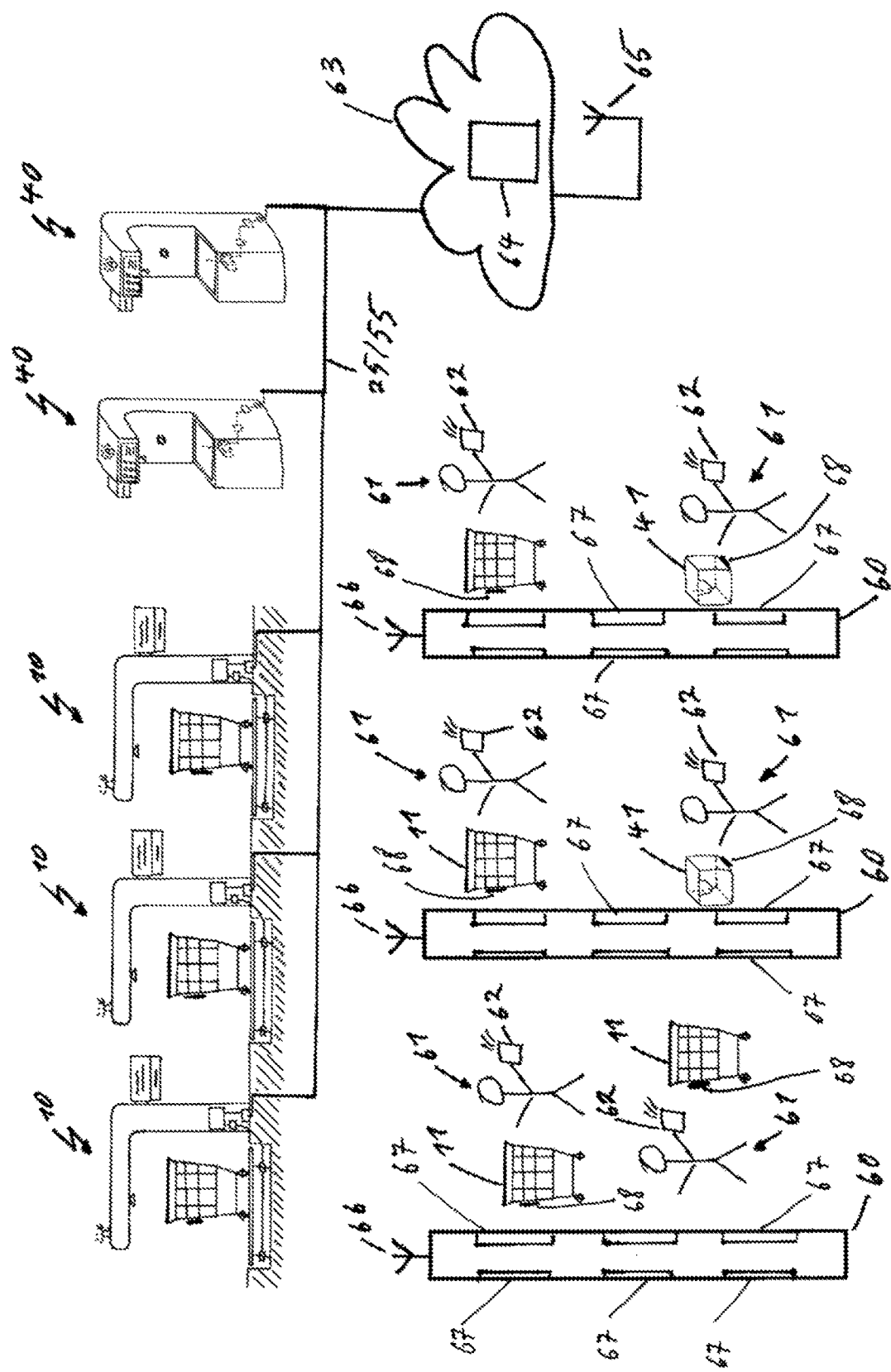
FIG. 1 shows a system for self-checkout in a store.

An aspect of the present invention provides a method for operating a sales device for goods and an associated sales device for self-checkout, which is simpler for the customer and less prone to errors.

According to an exemplary embodiment of the invention, a method for operating a sales device for goods is provided. The goods may be, in particular, retail goods. The method includes:

Detecting a removed item and determining its item data. This step is carried out by a shelf with automatic removal monitoring. In this context, automatic removal monitoring means that the shelf is designed in such a way that the removal of an item can be detected. In this context, automatic removal monitoring is not to be understood as meaning that the shelf or an inventory management system connected to the shelf necessarily has to know or calculate the current inventory on the shelf. In one embodiment, it is a shelf with integrated inventory monitoring, the functionality for detecting goods for inventory monitoring of which is simultaneously used as removal monitoring for the method for operating the sales device. In one embodiment, a removed item is detected with a camera or with an optical sensor. In one embodiment, a removed item is detected using weight sensors.

Reading out a customer identification number of a customer near the shelf from which an item is removed. In one embodiment, the customer identification number is read out using a proximity sensor on the shelf. In one embodiment, the proximity sensor detects a transmitter that comes into the vicinity of the shelf and that is attached to a shopping cart or shopping basket. The customer identification number is read out by the transmitter. In this case, the customer identification number is a unique number of the shopping cart or shopping basket. In this case, the number of the shopping cart or shopping basket serves as a pseudonym for the customer and thus as a customer identification number. In one embodiment, the proximity sensor detects a transmitter that comes into the vicinity of the shelf and that is integrated into a product scanner. In one embodiment, a product scanner is a smartphone with an app for scanning the items. In one embodiment, the invention aims at making the scanning of the items obsolete. However, in one embodiment, the method of the invention requires the customer to scan the items using a product scanner during the shopping process. The method according to the invention may then serve for the reliable verification of the scanned items and, in particular, for the detection of items that have been forgotten or deliberately omitted during scanning. In this embodiment, the product scanner serves as a transmitter for the customer identification number. In this case, the customer identification number is a unique number of the product scanner. In this case, the number of the product scanner serves as a pseudonym for the customer and thus as a customer identification number.

Receiving the item data of the removed item and the customer identification number. These item data and the customer identification number are received by a control device (controller).

Adding the item data of the removed item and the associated customer identification number to a list of items intended for payment. This step is carried out with the control device. The list of items intended for payment comprises items that have already been removed from the shelves, but have not yet been paid. This list is continuously updated by the control device.

Detecting items for which a payment transaction is to be executed. This step is carried out with a detection device (detector). The detection device comprises at least one sensor and an evaluation device (evaluator). In order to detect the items, at least data of the sensor and the list of items intended for payment are made available to the evaluation device as input variables.

The phrase "reading out a customer identification number" in this context is to be understood as meaning that a reading device in the proximity sensor reads out, for example, a memory which is attached to the shopping cart or shopping basket. In this context, "reading out a customer identification number" is also to be understood as meaning that the proximity sensor sends a request to a transmitter on the shopping cart or shopping basket and then contains a response of the transmitter with the customer identification number.

The person skilled in the art understands that the detection device is not necessarily a single module or component. For example, parts of the detection device may be accommodated in a sales device and other parts of the detection device may be accommodated, for example, in a network or a computing cloud. Rather, the detection device is to be understood as a cooperating system consisting of a plurality of individual and, where applicable, distributed parts.

In detection methods in self-checkout devices, cameras are often used to detect items in a shopping cart or shopping basket. In a small or medium-sized store, the assortment can range from several hundred to a few thousand items; in larger stores or supermarkets, it can comprise several tens of thousands of items. These items are stored in the sales device and must be recognized by the detection method. For example, especially when items lie on top of each other in a shopping cart and partially conceal each other so that optical sensors only partially detect the items, errors occur during the detection of the items. The method according to the invention has the advantage that an item is identified and assigned to a customer identification number when it is removed from the shelf. The assumption that this item is part of the respective purchase that a customer who has been assigned the corresponding customer identification number wants to pay for is very likely to be correct. Exceptions may be cases where two customers are at the shelf at the same time and remove two different items. In this case, it is not clear which item belongs to which customer identification number. Also included in this exception are cases where a customer leaves their shopping cart a bit out of the way and picks up an item from a shelf. This relates to a small number of items in the event of normal purchase. Therefore, in the detection method at the self-checkout sales device, which is based on sensor data, a large number of items in the shopping cart or basket are already known due to the items that are provided with a customer identification number. The unknown items are a small number, which are also on the list of items intended for payment but are not marked with a customer identification number. Since the object detection method thus has significantly fewer unknowns compared to the state of the art, the detection of the items is more process-safe and reliable.

In one embodiment, the method for detecting items for which a payment transaction is to be executed only detects items that belong to the list of items intended for payment.

In one embodiment, in a case where multiple shopping carts, shopping baskets or product scanners are read out by the proximity sensor, multiple customer identification numbers are associated with the removed item and sent to the control device. The control device stores at least two, in particular all, customer identification numbers with the item data in the list of items intended for payment. In this way, cases in which several customers stand at the shelf and remove something can be covered. Although the assignment of the customers to an item is then not unambiguous, since several customers are assigned to the item, this is information that facilitates the detection of the items.

In one embodiment, the at least one sensor of the detection device is at least one camera. In particular, this is at least one charge-coupled device (CCD) camera. In one embodiment, the data of the at least one sensor are image data. In one embodiment, the at least one sensor is a weighing cell. In one embodiment, the data of the at least one sensor is weight data.

In one embodiment, the step of detecting items for which a payment transaction is to be executed comprises:

Applying a method for object detection in the evaluation device. The method for object detection detects object-describing attributes in the data of the at least one sensor. These object-describing attributes are compared with object-describing attributes of items that are on the list of items intended for payment. This has the advantage that the object detection method only allows solutions as possible solutions, i.e., can only detect items, that have been removed from a shelf. Consequently, these items still have to be paid. While items that have not been removed from the shelf are still available in the assortment of the store, currently there should be no payment transaction for these items. Therefore, these items also cannot be recognized in the data of the sensor by the method for object detection. In one embodiment, the method for object detection is an optical method and is applied to image data of a shopping basket or shopping cart. In one embodiment, the optical method is based on edge detection, transformations, sizes and/or color detection.

In one embodiment, the proximity sensor detects the duration that a shopping cart, shopping basket or product scanner spends in the vicinity of the proximity sensor. In one embodiment, the proximity sensor detects the distance that a shopping cart, shopping basket or product scanner has to the proximity sensor. In one embodiment, the method for object detection determines the probability for an item in a shopping cart or shopping basket as a function of the distance of the transmitter from the proximity sensor. In one embodiment, the method for object detection determines the probability for an item in a shopping cart or shopping basket as a function of the duration during which the transmitter was in the vicinity of the proximity sensor.

This distance is also sent to the control device and stored in the list of items intended for payment. Optionally, this duration is also sent to the control device and stored in the list of items intended for payment. When detecting the items in the shopping cart or basket, the length of time spend in front of the shelf is included as a parameter. In one embodiment, a minimum duration is assumed for which a shopping trolley, shopping basket or product scanner has to be in the vicinity of the shelf so that the customer has sufficient time to remove an item. If the customer is in front of the shelf for a shorter period of time, it is assumed that the customer has merely passed the shelf and has not removed any item, i.e., no item is marked with the corresponding customer identification number. Then it is likely that another customer who has been in the vicinity the shelf has removed an item.

In one embodiment, at least one shelf with automatic removal monitoring for detecting the removed article performs the following:

Receiving a signal from at least two, preferably three or four weighing cells, which are arranged in the corners of a rigid body which forms a display area with at least two product areas. This means that the display area of a shelf is supported on a plurality of weighing cells. The weighing cells determine the weight force of the display area and the items which stand on the display area. The signals of the weighing cells correspond to the weight forces in the area of the corners of the rigid body.

Determining coordinates of the center of gravity and a total weight force from the received signals. These are determined by an evaluation unit from the signals of the weighing cells.

Receiving a signal corresponding to a new weight force from at least one weighing cell and determining new coordinates of the center of gravity with the evaluation unit from the data currently received from the weighing cells.

Determining a product area and a weight of the items removed from the product area.

Determining the item data of the item removed from the shelf on the basis of the determined product area and determining the number of removed items on the basis of the weight removed from the product area and the specific weight of the item.

In one embodiment, the display area is formed by a shelf compartment base, for example by a shelf board or a grid board of a shelf compartment.

The area on a rigid body from which an item has been removed can be determined using the coordinates of the center of gravity. For shelving, it is often the case that a rigid shelf base is supported by a frame. Several compartments are provided on the shelf base for various items. With the aid of a plurality of weighing cells, which are preferably attached to the corners of the rigid body, the area on the rigid body and thus the product area and thus also an associated item can be determined by determining the coordinates of the center of gravity. The total weight of the removed items can be used to determine the number of items removed from the product area.

In one embodiment, the evaluation unit determines a vector between the previous coordinates of the center of gravity and the new coordinates of the center of gravity when the total weight changes. The shelf area determined by a control device is determined from the vector and the total weight by the control device.

In one embodiment, the evaluation unit tares all weighing devices periodically and simultaneously. The coordinates of the center of gravity formed from the data of the weighing devices represent the center of gravity at which something was removed from or added to the shelf compartment base. In one embodiment, the evaluation unit for determining the new coordinates of the center of gravity forms the difference between a new weight value and a previous weight value for each weighing device. This means that when a product is removed from the shelf compartment base, the weight change at each weighing device is determined separately. The new coordinates of the center of gravity are determined from the four difference values, i.e., from the change in weight at each weighing device. Both embodiments result in the measured weight values of the four weighing devices being considered separately and in that no vector is calculated that has to be scaled. Thus, these two embodiments are less sensitive to tolerances in the determination of the weight value by the weighing devices.

In one embodiment, a method for object detection is a method that compares a measured weight value with the individual weight of the items on the list of items intended for payment. In one embodiment, optical methods and weight-based methods are combined in the method for object detection. If multiple objects are detected via a camera and their detection is determined on the basis of the list of items intended for payment, the total weight of these items is included as a further parameter. The method for object detection sums up the individual weights of the identified items from the list of the items intended for payment and checks this sum using the measured total weight.

In one embodiment, the method comprises:
  determining a total price for a payment transaction from the sum of all individual prices of the detected items for which a payment transaction is to be executed, and
  executing a payment transaction via a mobile payment method, a debit card or credit card, or via a cash payment transaction.

According to the invention, a sales device for self-checkout of goods in a store, in particular in a supermarket, is proposed. The store comprises at least one shelf with automatic removal monitoring and a network for exchanging data. The at least one shelf further comprises a proximity sensor suitable for detecting a transmitter in the vicinity of the shelf. A transmitter is in particular attached to a shopping cart or shopping basket or integrated into a product scanner. The sales device comprises a control device for controlling the sales device and a communication unit for receiving data from the network and a database for storing item data and object-describing attributes associated with the items. The control device is designed to receive item data of removed items from the at least one shelf with automatic removal monitoring via the network. Furthermore, the control device is designed to receive, via the network, customer identification numbers associated with the item data and read out by the proximity sensor, and preferably associated distance. The control device is designed to determine therefrom a list of the items to be paid. The sales device comprises a detection device having at least one sensor and an evaluation device. The detection device determines, with the evaluation device, for which items a payment transaction is to be executed on the basis of the data of the sensor and the list of the items intended for payment.

In one embodiment, the interaction of proximity sensor and transmitter is realized via a tracking system in the store. The proximity sensors on the shelves in the preceding embodiment have the purpose of detecting when a shopping cart, shopping basket or product scanner is located in the vicinity of the shelf. The same object can be achieved by a tracking system. The position of each shopping cart, shopping basket or product scanner in the store is tracked and, if the location of the shelves is known, the customer identification number in the vicinity of a shelf can also be determined.

In one embodiment, the evaluation device recognizes object-describing attributes from the data of the at least one sensor. These object-describing attributes are compared with object-describing attributes of items that are on the list of items intended for payment.

In one embodiment, the sales device is a part of a group of a plurality of sales devices in the store. The database is a common database for all sales devices of the group of the plurality of sales devices. The sales devices are connected to the database via a network.

In one embodiment, at least parts of the detection device, the control device, the evaluation device and/or the database are located outside the store, in particular on a server or in a cloud network. The sales device accesses these parts of the detection device, the control device, the evaluation device, and/or the database via a network.

In one embodiment, the method for operating the sales device comprises the step of:

Resetting, at a time, especially when opening the store in the morning of the list of items intended for payment.

This means that at this point in time, all items that are intended for payment but have not yet been paid are deleted from the list. This can be, for example, shortly before opening the store in the morning. On the other hand, an employee can, for example, manually select this point in time and manually delete the list if they notice that there are no customers in the store. For example, at a time when there is no customer in the store, no items may be noted on the list of items intended for payment. If there are still items on the list, an error has occurred during the sales process. Either the items were not correctly billed during the payment transaction, the customer removed an item from the shelf and placed it at another location in the store, or the removal of the item from the shelf with automatic removal monitoring was incorrectly detected. Deleting the list is similar to a reset of the system so that the erroneous entries do not accumulate on the list over time and impair the performance of the system. The information on how many items need to be deleted from the list of items intended for payment also reflects how many items have been taken without permission, for example, due to theft.

In one embodiment, the method for operating a sales device comprises the step of:

verifying, with the evaluation device, whether the detected items match the data of the sensors, in particular the data of at least one optical sensor and of at least one weight sensor, and/or whether the probability of correctly detecting the items exceeds a threshold value, and if the probability of correct detection does not exceed the threshold value and/or no match of the data is detected, suggesting at least one item from the list of items intended for payment on an input device of the sales device for manual selection by a customer.

FIG. 1 shows a system for self-checkout in a store. In a store, a plurality of customers 61 are present who themselves become operators during self-checkout at the sales devices 10, 40. The customers 61 go with a shopping cart 11 or a shopping basket 41 to the shelves 60 in order to take products and put them in their shopping cart 11 or shopping basket 41. The shelves 60 have one or more proximity sensors 67 that detect the presence of a transmitter 68 in the vicinity of the proximity sensors 67. The transmitters 68 have a unique customer identification number that the proximity sensors 67 read out wirelessly. This means that the transmitters transmit the customer identification numbers wirelessly to the proximity sensors 67. The transmitters 68 are attached to a shopping cart 11 or shopping basket 41. If a shelf 60 detects the removal of an item, the proximity sensor 67 also detects the presence of a transmitter 68. On shelf 60, the unique customer identification number of the transmitter 68 is sent, together with the item data, to a control device (controller) 64 via a network 65, 66. It is not obligatory that the customer 61 itself scans the items with a product scanner 62. In one embodiment, however, the inventive method is used solely to validate the purchases of customer 61, and customer 61 is required to scan each item they remove from a shelf 60 with a product scanner 62 before placing it in the shopping cart 11 or shopping basket 41. In one embodiment, the product scanner 62 is a smartphone on which a corresponding app is running. The smartphone used as the product scanner 62 is equipped with various technologies that can communicate with the proximity sensor 67, such as Bluetooth. In this embodiment, no separate transmitter 68 is provided on the shopping cart 11 or shopping basket 41. Rather, the product scanner 62 serves as a transmitter from which the proximity sensor 67 reads the customer identification number.

Figure 2:
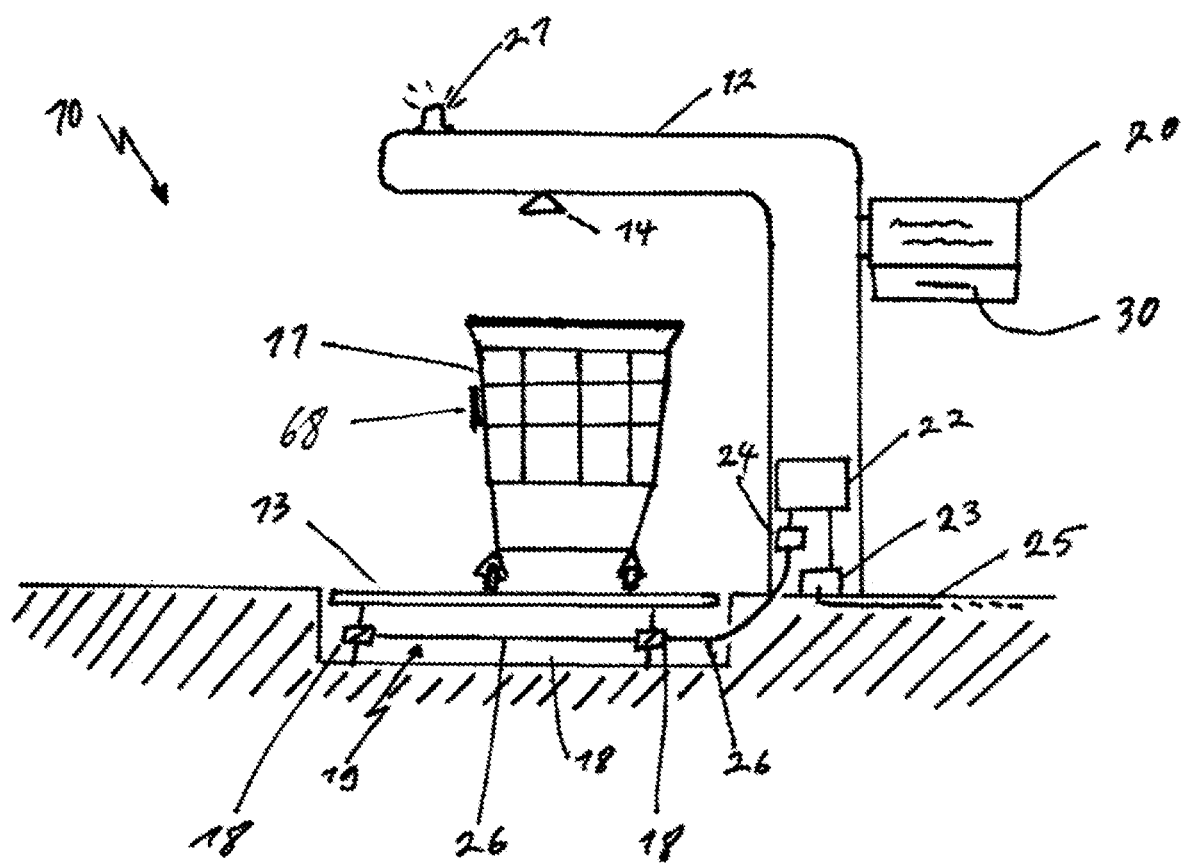
FIG. 2 shows a sales device in a first embodiment.

The store comprises one or more sales devices 10 suitable for self-checkout with a shopping cart 11, shown in detail in FIG. 2. The store alternatively or additionally comprises one or more sales devices 40 that are suitable for self-checkout with a shopping basket 41, shown in detail in FIG. 3. The sales devices 10, 40 are connected to a computing cloud 63 via a network 25, 55. The computing cloud 63 comprises a control device 64 that receives images and weight values of a shopping cart 11 or a shopping basket 41 and a customer identification number from the sales device 10, 40 via the network 25, 55. The shelves 60 are equipped with automatic removal monitoring, the function of which is described in detail with reference to the drawings of FIG. 4 to FIG. 9. If a customer removes a product from the shelf, the shelf transmits uses a communication device 66 to transmit the item data and the number of removed items to the computing cloud 63. The shelf also transmits the associated customer identification number with the communication device 66. Communication takes place, for example, via a wireless network 65 (as indicated in FIG. 1), in particular a public mobile network or a wireless local area network (WLAN) of the store, or a wired network (not shown in FIG. 1), in particular a local area network (LAN). In one embodiment, the computing cloud 63 comprises a control device 64. In one embodiment, the network 63 is a computing cloud, i.e., a cloud network in which the function of the control device 64 is implemented. In one embodiment, instead of the computing cloud 63, a network is provided which is provided exclusively for data transmission and the control device is provided in one or all of the sales devices 10, 40. In one embodiment, the control device 64 is a server in a network 25, 55, 62, 63, 65, 66, wherein the network 25, 55, 62, 63, 65, 66 connects servers 64, shelves 60 and sales devices 10, 40.

FIG. 2 shows a sales device 10 in a first embodiment. The sales device 10 comprises a frame 12 beneath which a shopping cart 11 can be pushed. Beneath the frame 12, the shopping cart 11 has a defined position (rest position) on a support plate 13. The support plate 13 is a load plate of scales and is mechanically connected to the force introduction side of one or more weighing cells 18. The scales determine the total weight of the shopping cart 11 with its contents. The frame 12 further comprises at least one camera 14 that is designed to create at least one image of a view of an open side of the shopping cart 11. Given a shopping cart 11, the top side is normally open. However, an open side in the sense of this disclosure is also, for example, a side part of the shopping cart which consists of transparent material. Within the scope of the invention, it shall also be deemed an open side if the shopping cart consists of a wide-meshed metal grid through which an image capture of the content of the shopping cart can be made. Within the scope of this disclosure, it is not to be deemed an open side if the side of a shopping cart consists of non-transparent plastic or is concealed by a non-transparent advertising panel. Sales device 10 further comprises a receiver for reading out the customer identification number from the transmitter 68 of the shopping cart 11 or from the product scanner 62.

The at least one weighing cell 18, in particular four weighing cells 18, is connected to a weight value processing device (weight value processor) 24 that determines a weight value of the shopping cart 11 from the signals from the weighing cell 18 or weighing cells 18. The weight value processing device 24 includes a weight value memory for storing the weight value. The at least one camera 14 and the weight value processing device 24 are connected to a controller 22 and transmit the determined data to the controller 22. The controller 22 is connected to a communication device 23, through which the controller 22 communicates data such as images and weight and customer identification number to a network 25 and receives at least a retail price and a listing of items in the shopping cart 11 from the network 25. The sales device comprises an input/output unit 20 with which an operator can interact with the sales device 10. The input/output unit 20 also comprises a payment unit 30 at which preferably cashless payment can be made. The input/output unit 20 displays the data received from the network 25, in particular the items in the shopping cart 11 and their price, and directs the operator through a payment transaction with the payment unit 30. After payment of the items, the input/output unit 20 outputs to the operator a corresponding notification that they can leave the store with their purchases. Optionally, the input/output unit 20 comprises a printer to print a receipt of the completed purchase for the operator. After the operator has paid for the items in the shopping cart 11, the controller 22 sends a message via the network that these items have been paid for. This message is used in the control device 64 located on the network 63 to remove the paid items from the list of items intended for payment, as will be explained in more detail below.

Figure 3:
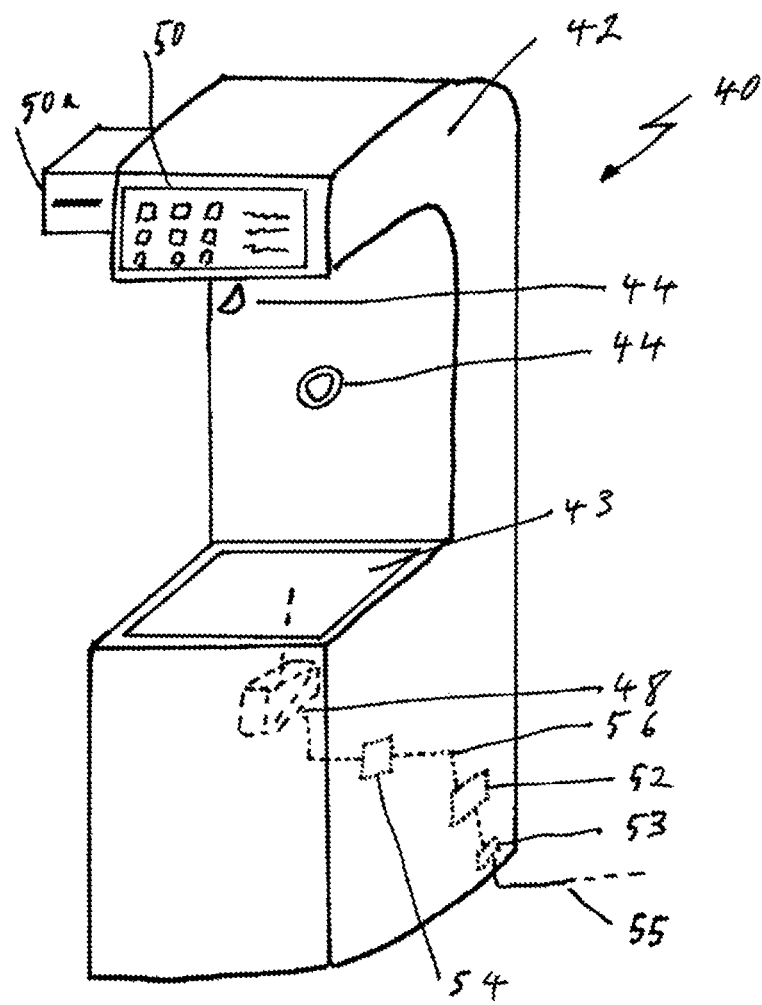
FIG. 3 shows a sales device in a second embodiment.

FIG. 3 shows a sales device 40 in a second embodiment. This embodiment is suitable for detecting and accounting for the contents of a shopping basket 41. A frame 42 is designed in such a way that it forms a support for the shopping basket 41, which support is not located down on the floor but rather at an ergonomic height for the operator. The frame 42 comprises an upper part which projects over the parked shopping basket 41. In the frame, a support plate 43 is formed on which the shopping basket 41 can be placed with its underside. The frame 42 holds at least one camera 44 which is positioned such that it can make an image of the content of the shopping basket 41 from an open side of the shopping basket 41. The sales device 40 further comprises a receiver for reading out the customer identification number from the transmitter 68 of the shopping basket 41 or from the product scanner 62.

The sales device 40 includes scales. A support plate 43 forms the load plate of the scales and is mechanically connected to the force introduction side of a weighing cell 48 accommodated in the frame 42. The weighing cell 48 is connected to a weight value processing device 54 which determines a weight value of the shopping basket 41 from the signals of the weighing cell 48 and stores said weight value in a weight value memory. In this embodiment as well, the support plate 43 can be supported by a plurality of weighing cells 48. Since a shopping basket 41 is not as heavy and not as large as a shopping cart 11 and the support plate 43 is correspondingly smaller in design than in the first embodiment, in a preferred embodiment one weighing cell 48 is sufficient for weight determination. The weight value processing device 54 passes the weight value to a controller 52, which for its part is connected to a communication device 53. The controller 52 controls the processes in the sales device 40. The communication device 53 is connected to a network 55. The sequences predetermined by the controller 52 and the data transmitted by the communication device 53 via the network 55 are analogous to the first exemplary embodiment. The upper part of the frame 42 comprises an input/output unit 50. The input/output unit 50 can be integrated into the housing of the frame 42 and is a touchscreen, for example. A payment unit 50a is mounted on the frame. The payment unit 50a can also be integrated into the input/output unit 50. The payment unit 50a serves for cashless payment at the sales device 40.

Figure 4:
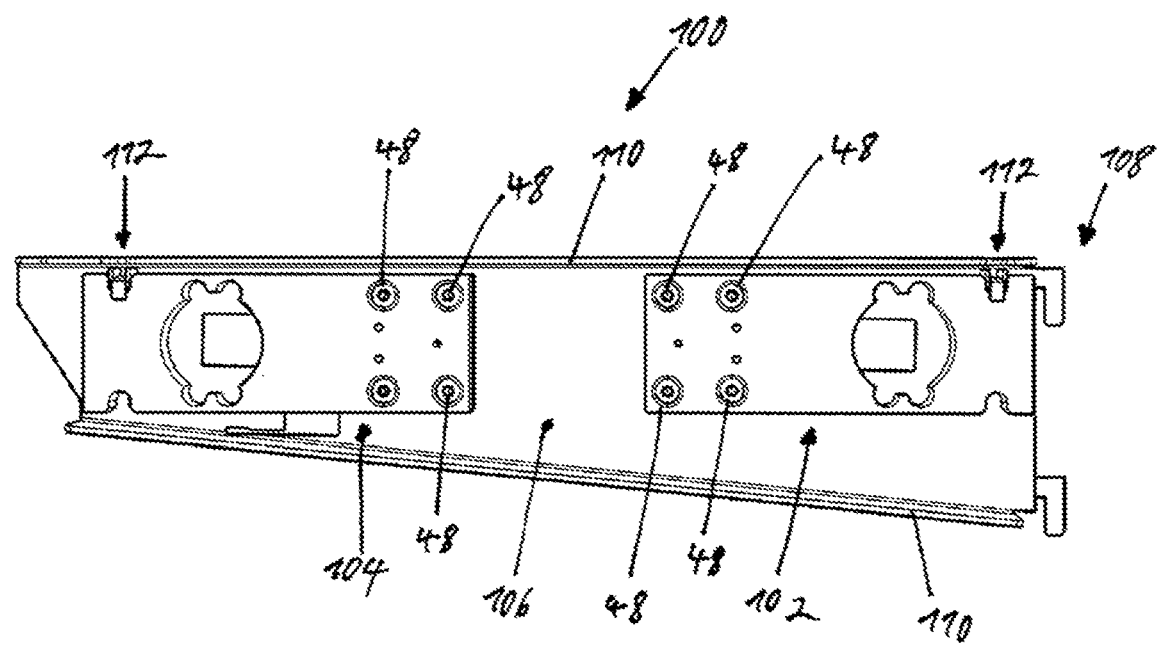
FIG. 4 shows a shelf console with two weighing devices.

FIG. 4 shows a side view of the inside of a shelf console 100.

The shelf console 100 consists of a cantilever 106 extending in the horizontal direction, which is formed from a vertically arranged sheet metal. In order to increase stability, the cantilever 106 has a stiffening rib 110 on its upper side and on its underside. The stiffening rib is realized by a bending of the metal sheet by 90°. At an axial end of the cantilever 106, the shelf console 100 comprises an anchoring device 108 in the form of two hooks by means of which the shelf console can be fastened in a shelf rail. Shelf rails are often designed as vertically attached rails with slots arranged one above the other so that the shelf consoles can be fastened to the shelf rail at various heights.

Two shelf consoles 100 attached to two spaced shelf rails at the same height support a shelf compartment base and thus form a shelf compartment. The cantilever 106 is triangular in shape, that is to say, in the area of the anchoring device 108, the height of the cantilever is greater than at the opposite axial end corresponding to the front area of the shelf compartment.

The cantilever further comprises two weighing devices 102, 104, wherein a weighing device 102 is attached in the area of the anchoring device 108 and a weighing device 104 is attached in the area of the other axial end of the cantilever 106. The weighing devices 102, 104 are fastened to the cantilever 106 with screws 48.

Each weighing device 102, 104 comprises a force introduction section 112 with a receiving element having a receptacle. A strut of a shelf compartment base may be introduced into the receptacle so that the force introduction sections of the weighing devices 102, 104 support and hold the shelf compartment base via its struts. In this case, the receiving element is freely accessible from above, so that the shelf compartment base is supported exclusively via the force introduction sections 112 of the weighing devices 102, 104.

Each weighing device 102, 104 is associated with a circuit board with electronics arranged thereon, in particular an analog-digital converter, for processing at least one output signal of a strain gauge of the weighing devices 102, 104. The weight of the shelf compartment base as well as the items deposited on the shelf compartment base is measured by the weighing devices 102, 104. The weight values, and in particular the change in the weight values of the four weighing devices 102, 104, are used to calculate at which location on the shelf an article is removed, as shown in the description with reference to FIG. 6. In this way, the removed item can be identified. This corresponds to a removal monitoring of the shelf.

FIG. 4 shows a shelf console 100 which, when viewed from the front, forms the left shelf console of a shelf compartment. A shelf compartment also comprises a right shelf console, so that the shelf compartment base is supported on the left side by the left shelf console and on the right side by the right shelf console. Left shelf console, right shelf console, and shelf compartment base together form a shelf compartment on which items can be placed and removed. The right shelf console is constructed mirror-symmetrically to the left shelf console.

Figure 5:
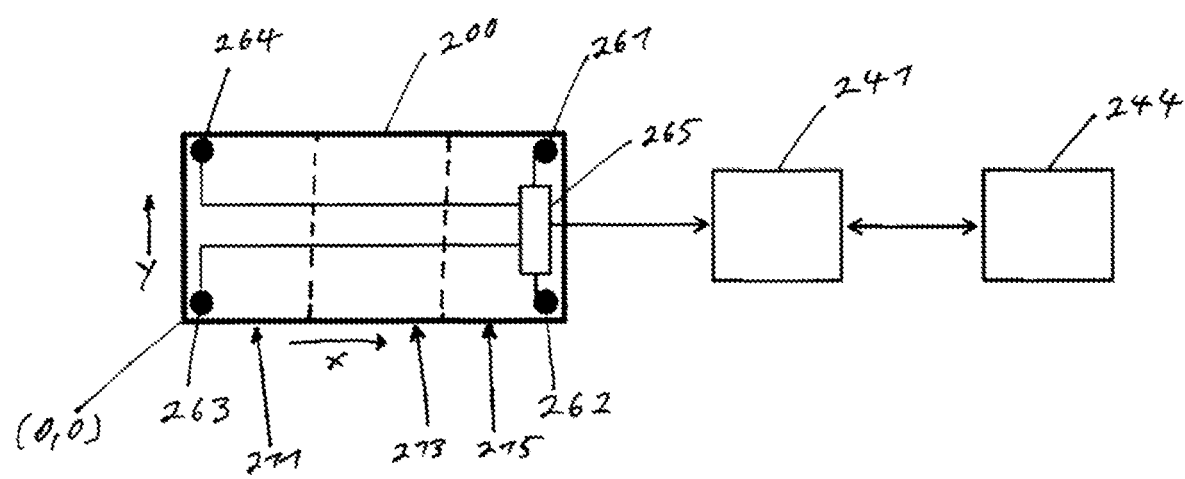
FIG. 5 shows a block diagram of a shelf.

FIG. 5 schematically shows three shelf areas 211, 213, 215 on a shelf compartment base 200 and corresponding components for removal monitoring. The shelf area 211, 213, 215 from which a product has been removed from the shelf compartment base 200 is determined by determining the center of gravity of the shelf compartment base 200.

The shelf compartment base 200 is suspended by the four weighing devices 261, 262, 263, 264. These are the weighing devices 102, 104, which are integrated into the shelf consoles 100. A shelf console 100 to the left of the shelf compartment base 200 and a shelf console 100 to the right of the shelf compartment base 200 support the shelf compartment base 200. The force introduction sections of the weighing devices 261, 262, 263, 264 support the shelf compartment base 200 at the ends of its struts.

The weighing devices 261, 262, 263, 264 independently determine an effective weight force created by the shelf compartment base 200 and the articles deposited in the shelf areas 211, 213, 215. In this case, a single weight force acts on each weighing device 261, 262, 263, 264 in proportion to the total weight. The data from the weighing devices 261, 262, 263, 264 are transmitted to an evaluation unit 265. The evaluation unit 265 determines coordinates of the center of gravity of the shelf compartment base 200 from the individual weight data of the weighing devices 261, 262, 263, 264. The coordinates in the shelf area 211, 213, 215 start at one corner of the weighing device 263 with the coordinates (0, 0) and extend in the horizontal direction X and in the vertical direction Y.

To illustrate the determination of the center of gravity, the weighing devices 261, 262, 263, 264 are assigned the corresponding weight data W261, W262, W263, W264, as shown in FIG. 5.

The formation of the center of gravity in the X direction is determined as follows:

$$(W261+W262)/(W261+W262+W263+W264)$$

The formation of the center of gravity in the Y direction is determined as follows:

$$(W261+W264)/(W261+W262+W263+W264)$$

Using a corresponding normalization factor that takes into account the size of the shelf compartment base 200, coordinates in the shelf area 211, 213, 215 corresponding to the coordinates of the center of gravity of the shelf compartment base 200 can be determined. These coordinates are determined in the evaluation unit 265 on the basis of the data of the weighing devices 261, 262, 263, 264.

Furthermore, the evaluation unit 265 forms a total weight W261+W262+W263+W264. The coordinates of the center of gravity and the total weight are transmitted by the evaluation unit 265 to a control device 241. The shelf comprises a memory 244 in which a mapping between coordinates of the center of gravity and shelf areas 211, 213, 215 is stored. The memory 244 further stores, for each shelf area 211, 213, 215, the average weight of a piece of an item in that shelf area 211, 213, 215. With this arrangement, in addition to the shelf areas 211, 213, 215 shown in FIG. 5, which are arranged side by side in the X direction, it is also possible to determine shelf areas which are arranged in rows and columns in the X and Y directions, i.e., in a matrix.

Figure 6:
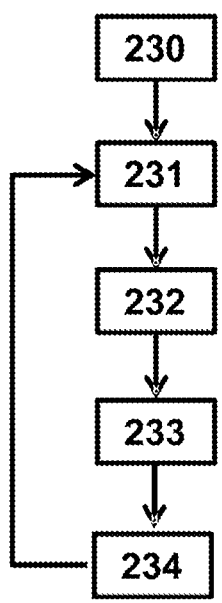
FIG. 6 shoes a method for operating a shelf.

FIG. 6 shows a method for automatic removal monitoring in a shelf 60, which is executed by a control device 241.

In step 230, the shelf areas 211, 213, 215 of the shelf compartment base 200 are populated with items. In this process, memory 244 is used to assign items to each shelf area 211, 213, 215 and to store a weight per item. Furthermore, the X and Y coordinates of each shelf area 211, 213, 215 are stored in the memory 244. These coordinates do not have to be restored with each filling, since they do not change. However, if the size of the shelf areas 211, 213, 215 and their arrangement is changed by rearranging the partitions, the mapping between X and Y coordinates and shelf areas 211, 213, 215 are updated in memory 244. It is thus stored in the memory 244 over which X and Y coordinates each shelf area 211, 213, 215 extends.

In step 231, an evaluation unit 265 is used to determine from the weight values of the weighing devices 261, 262, 263, 264 a location where one or more items have been removed and to determine the total weight of the removed items. The determination in step 231 can be carried out using three alternative methods, which are described below with reference to FIG. 7 and FIG. 9.

In step 232, the control device 241 determines the assigned shelf area 211, 213, 215 on the basis of the coordinates of the location where something was removed and by means of the information from the memory 244 about the arrangement of the shelf area 211, 213, 215.

In step 233, the number of items removed from the shelf area 211, 213, 215 is determined from the determined total weight of removed items and the weight value for an item associated with the shelf area 211, 213, 215 in memory 244. Thus, the number of removed objects is determined.

In step 234, the information as to which items and how many items have been taken is sent to the computing cloud 63 using the communication device 62 of the shelf 60. The method is then continued with step 231 with the removal of another item.

Figure 7:
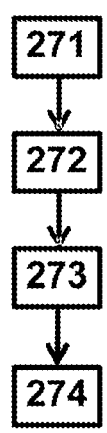
FIG. 7 shows a first method for determining a location on the shelf compartment base at which a product was removed or added.

FIG. 7 schematically shows a first method for determining a location on the shelf compartment base 200 where an item was removed.

In step 271, all the weighing devices 261, 262, 263, 264 are tared, that is, the shelf compartment base 200 and all items placed thereon are treated as if they were a preload for the weighing devices 261, 262, 263, 264 and set to zero. In step 272, a new weight value is measured by at least one weighing device 261, 262, 263, 264 and received by the evaluation device 265. In step 273, the evaluation device 265 calculates coordinates of the center of gravity on the basis of the current weight data of the weighing devices 261, 262, 263, 264. These coordinates of the center of gravity do not reflect the center of gravity of the shelf compartment base 200, but rather the center of gravity of the change in weight in the coordinate system of the shelf compartment base 200. This is the location at which an item was removed from the shelf compartment base 200. In step 274, this location and the change in weight is passed on to the control device 241.

Figure 8:
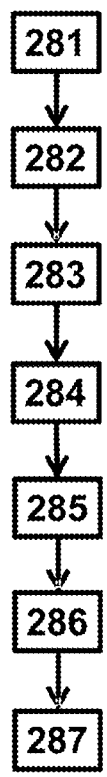
FIG. 8 shows a second method for determining a location on the shelf compartment base at which a product was removed or added.

FIG. 8 schematically shows a second method for determining a location on the shelf compartment base 200 at which an item was removed.

In step 281, coordinates of the center of gravity of the current center of gravity of the shelf compartment base 200, including all the items placed thereon, are determined. This is the true center of gravity. The shelf compartment base 200 or at least the items placed thereon are not tared. In step 282, a new weight value is measured by at least one weighing devices 261, 262, 263, 264 and received by the evaluation device 265. In step 283, new coordinates of the center of gravity are determined by the evaluation device 265 from the new data of the weighing devices 261, 262, 263, 264. In step 284, a vector reflecting the shift in the coordinates of the center of gravity is formed from the previous coordinates of the center of gravity and the new coordinates of the center of gravity. Starting from the previous center of gravity, the vector leads to the new center of gravity unless the vector is scaled. Then, in step 285, the vector is scaled using the total weight of the shelf compartment base and the change in total weight. The location at which a product was taken from the shelf compartment base 200 results in step 286 by adding the scaled vector to the previous coordinates of the center of gravity. In step 287, this location and the change in weight is passed on to the control device 241.

Figure 9:
FIG. 9 shows a third method for determining a location on the shelf compartment base at which a product was removed or added.

FIG. 9 schematically shows a third method for determining a location on the shelf compartment base 200 where an item was removed.

In step 291, all weighing devices 261, 262, 263, 264 respectively determine a weight value, the preceding weight value. In step 292, a new weight value is measured by at least one weighing device 261, 262, 263, 264 and received by the evaluation device 265. In step 293, the evaluation unit 265 calculates the change in weight value separately for each weighing device 261, 262, 263, 264, i.e., the evaluation unit constitutes the difference between the new weight value and the preceding weight value. In step 294, the evaluation device (evaluator) 265 calculates the coordinates of the center of gravity of the difference values of the four weighing devices 261, 262, 263, 264. These coordinates of the center of gravity do not reflect the center of gravity of the shelf compartment base 200, but rather the center of gravity of the change in weight in the coordinate system of the shelf compartment base 200. This is the location at which an item was removed from the shelf compartment base 200. In step 295, this location and the change in weight is passed on to the control device 241.

Figure 10:
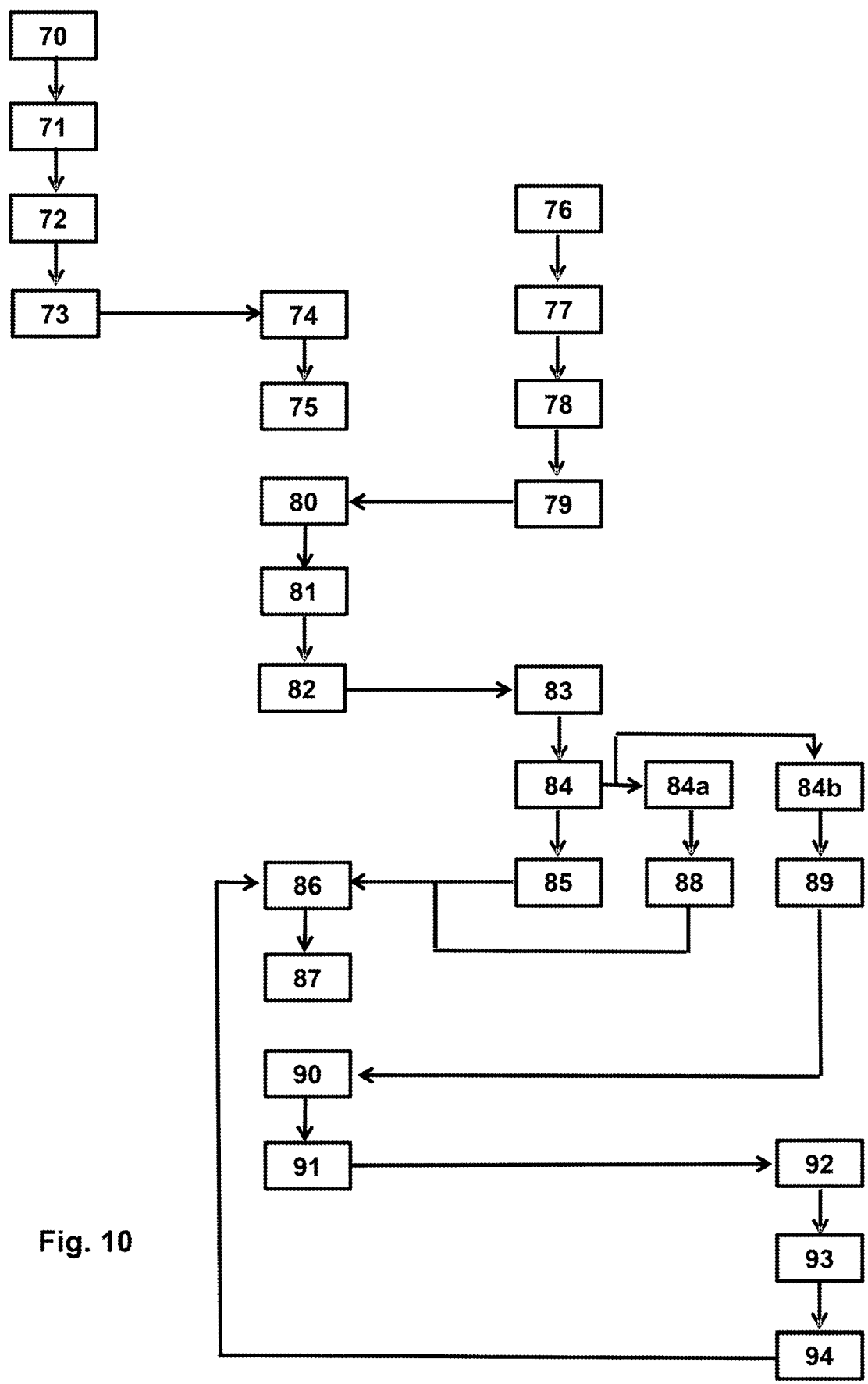
FIG. 10 shows a method for self-checkout in a store.

FIG. 10 schematically shows a method for self-checkout in a store. The method steps are carried out in part by a shelf 60 with automatic removal monitoring, in part by a sales device 10, 40 and in part by a control device 64 in a computing cloud 63 or on a server in a network. The steps on the left side in FIG. 10 are executed by the shelf 60 with automatic removal monitoring, while a customer walks through the store and collects the items for their purchase. The steps on the right-hand side in FIG. 10 are executed by the sales device 10, 40. The steps in the middle of FIG. 10 are executed by the computing cloud 63 with a control device 64 or by a server which can also perform the function of a control device.

During self-checkout in a store, the customer is responsible for taking their purchases from the shelves 60 themselves, and, to complete the purchase, paying for the products themselves at a sales device 10, 40 for self-checkout. The computing cloud 63 is responsible for compiling the billing. The store can consequently do without the cashier staff. The customer replaces the cashier staff and is thus himself an operator of the self-checkout sales device 10, 40.

The customer takes a shopping cart 11 or shopping basket 41 and walks through the store with it and takes the desired items from the shelves 60. In step 70, a proximity sensor 67 detects the presence of a transmitter 68, 62 near a shelf 60. In step 71, the proximity sensor 67 reads out the customer identification number from the transmitter 68, 62. The transmitters 68, 62 are attached to a shopping cart 11 or shopping basket 41 or integrated into a product scanner 62. If several transmitters 68, 62 are detected in the vicinity of the shelf, several customer identification numbers are read out. Meanwhile, the shelves 60 continuously and automatically monitor the removal of items by the customers. This takes place in a step 72. These steps are carried out by all shelves and for all transmitters. The removal monitoring and the detection of a removed item as well as the determination of its item data are carried out in accordance with the description with reference to FIG. 4 to FIG. 9. In step 73, the shelf 60 sends the item data of the removed items as well as their number and the associated customer identification number or the associated customer identification numbers to the computing cloud 63 via the communication device 66.

In step 74, a control device 64 in the computing cloud 63 receives the item data, the customer identification number or customer identification numbers and the number of removed items. In step 75, the control device 64 adds the item data and the number of removed items and the associated customer identification number or the associated customer identification numbers to a list of items intended for payment. These steps take place continuously for all shelves. The list thus comprises a customer identification number for each item in the event that exactly one transmitter 68, 62 was detected in the vicinity of the shelf when the item was removed. The list comprises an item without a customer identification number in the event that no transmitter 68, 62 was detected in the vicinity of the shelf when the item was removed. The list comprises an item having two or more customer identification numbers in the event that two or more transmitters 68, 62 were detected simultaneously in the vicinity of the shelf when the item was removed.

In step 76, the sales device 10, 40 detects the placement of a shopping cart 11 or shopping basket 41 on the support plate 13, 43 due to the change of a weight value measured with a weighing cell 18, 48 and an associated weight processing device 24, 54 and determines the weight of the shopping cart 11 or shopping basket 41 along with its contents. In this process, the empty weight of the shopping cart 41 or shopping basket 41 is subtracted from the measured weight so that only the weight of the items in the shopping cart 11 or shopping basket 41 is determined. In step 77, the sales device 10, 40 reads out the customer identification number from the transmitter 68 on the shopping cart 11 or shopping basket 41 or from the product scanner 62 of the customer. In step 78, at least one image of an open side of the shopping cart 11 or shopping basket 41 is captured by the camera 14, 44 of the sales device 10, 40. In step 79, the image data and weight data and the customer identification number are sent from the sales device 10, 40 to the computing cloud 63 via a network 25, 55.

In step 80, the computing cloud 63 receives the customer identification number, the image data and the weight data from the sales device 10, 40. The control device 64 of the computing cloud 63 comprises an evaluation unit which detects all items located in the relevant shopping cart 11 or shopping basket 41 on the basis of the customer identification number, the weight data and the image data in step 81. In this process, the evaluation device uses the image data as a basis and performs an object detection method. In order to increase the reliability and accuracy of the object detection method, the list of items intended for payment is used as a basis. The evaluation device only allows the detection of items that are on the list of items intended for payment. This increases the probability of correct object detection, since items that are not present on the list of items intended for payment, and therefore cannot be in the shopping cart or shopping basket, are not permitted as possible solutions of the object detection method. All items that are stored in the list of items intended for payment with the customer identification number received together with the image data and weight data and do not have another customer identification number are very likely to be in the shopping cart 11 or basket 41. All items stored in the list of items intended for payment with a customer identification number other than the one received together with the image data and weight data are very likely not to be in the shopping cart 11 or shopping basket 41. All items that do not have a customer identification number or have at least one other customer identification number in addition to the customer identification number received together with the image data and weight data are in the shopping cart 11 or basket 41 with a medium probability. Furthermore, the evaluation device only allows solutions in which a set of items is detected whose summed individual weights correspond to the measured weight of the items in the shopping cart 11 or shopping basket 41 transmitted by the sales device 10, 40. The person skilled in the art is aware that the method for object detection is performed on the basis of probability calculation and that the weight data serve to increase the probability in favor of one or the other solution in the evaluation device. Items that are not on the list of items intended for payment are evaluated by the evaluation device with a probability of zero or a very low probability of being present in the shopping cart 11 or shopping basket 41. In step 82, the computing cloud 63 sends the detected items to the sales device 10, 40.

In step 83, the sales device 10, 40 receives the detected items from the computing cloud 63. In step 84, the sales device 10, 40 starts the payment transaction with the customer via the input/output unit 20, 50 and the payment unit 30, 50*a*. Once the customer has paid for the items, they can leave the store. In step 85, the sales device 10, 40 then sends a confirmation to the computing cloud 63. In step 86, the computing cloud 63 receives the confirmation about the payment transaction of the items and, in step 87, deletes the paid items from the list of items to be paid using the control device.

If the customer determines in step 84 that the items suggested to them for payment are not correct, they may enter this fact into the sales device 10, 20 via the input/output unit 20, 50 in an alternative step 84*a* or 84*b*.

If, during the payment process, at least one item is displayed to the customer that the customer does not wish to purchase, wherein the other items are correct, the customer can manually delete this at least one item in step 84*a* via the input/output unit 30, 50. In a step 88, the sales device 10, 20 then sends a corrected list of paid items to the computing cloud 63, and the method continues with step 86.

On the other hand, if the customer is shown an item less or an incorrect item during the payment transaction, the customer can enter this into the input/output unit 30, 50 of the sales device 10, 40 in step 84*b*. In step 89, the sales device 10, 40 sends a request for item suggestions to the computing cloud 63. In step 90, computing cloud 63 receives the request for item suggestions. In step 91, the computing cloud 63 sends, from the list of items intended for payment, the items for which no customer identification number is stored and/or the items for which another customer identification number is stored in addition to the customer identification number read out in step 77. These two categories of items correspond to the items whose association with a shopping cart 11 or a shopping basket 41 has the most inaccuracies. It is likely that an error has been made when assigning the items to the shopping cart 11 or shopping basket 41 for one of these items. In step 92, the sales device receives the items. In step 93, these items are offered to the customer for selection by the sales device 10, 40 via the input/output device 20, 50. Thus, the customer may select or replace the missing or incorrect items and enter the correct items for the payment transaction into the sales device 10, 40. In step 93, the customer executes the payment transaction for their purchase. In step 94, the sales device 10, 40 sends the list of paid items to the computing cloud. The method then proceeds to step 87 in the computing cloud 63.

The functions of various elements shown in the drawings, including the functional blocks, may be realized by dedicated hardware or by generic hardware capable of executing software in conjunction with the corresponding software. If the functions are provided by means of a processor, they may be provided by a single dedicated processor, a single shared processor, or a plurality of generic processors which may in turn be shared. The functions may be provided, without limitation, by a digital signal processor (DSP), network processor, application-specific integrated circuit (ASIC), field programmable gate array (FPGA), read-only memory (ROM) with stored software, random access memory (RAM), and nonvolatile memories.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for operating a sales device for goods, the method comprising:
   detecting, using a shelf with automatic removal monitoring, a removed item and determining item data of the removed item;
   reading out a customer identification number of a customer in a vicinity of the shelf from which the removed item has been removed;
   receiving, by a controller, the item data of the removed item and the customer identification number;
   adding, with the controller, the item data of the removed item and the customer identification number to a list of items intended for payment; and
   detecting, with a detector, items for which a payment transaction is to be executed, the detector comprising at least one sensor and an evaluator and for detecting articles, at least the data of the sensor and the list of items intended for payment are being made available to the evaluator as input variables,
   wherein the reading out of the customer identification number comprises detecting, with a proximity sensor, a shopping cart or shopping basket, wherein the shopping cart or shopping basket comprises a transmitter which is configured to be read out by the proximity sensor,
   wherein a plurality of customer identification numbers is transmitted from the shelf and received by the controller upon the proximity sensor detecting a plurality of shopping carts, shopping baskets, or product scanners, and the controller stores at least two of the customer identification numbers with the item data of the removed item in the list of items intended for payment,
   wherein the proximity sensor detects the distance of each of the shopping carts, each of the shopping baskets or each of the product scanners to the proximity sensor and, upon the customer identification number being associated with the item, the distance to the transmitter of the respective customer identification number is stored in the list of items intended for payment, and
   wherein the at least one sensor of the detector is:
      at least one camera, and the data of the at least one sensor are image data, or
      at least one weighing cell, and the data of the at least one sensor are weight data.

2. The method for operating the sales device according to claim 1, wherein the reading out of the customer identification number further comprises:
   detecting, with the proximity sensor, a product scanner, wherein the product scanner comprises another transmitter that is configured to be read out by the proximity sensor.

3. The method for operating the sales device according to claim 2, wherein the proximity sensor detects the amount of time that the shopping cart, the shopping basket, or the product scanner is in proximity to the proximity sensor.

4. The method for operating the sales device according to claim 1, wherein the detecting of the items for which the payment transaction is to be executed comprises:
   executing a method for object detection in the evaluator, wherein the method for object detection comprises detecting object-describing attributes in the data of the at least one sensor and comparing the object-describing attributes in the data with object-describing attributes of items that are on the list of items intended for payment.

5. The method for operating the sales device according to claim 4, wherein for the object detection method, the probability of an item on the list of items intended for payment adjusts as a function of the distance of the transmitter from the proximity sensor or as a function of the duration during which the transmitter has been in proximity to the proximity sensor.

6. The method for operating the sales device according to claim 1, wherein the detecting of the items for which the payment transaction is to be executed recognizes only items belonging to the list of items intended for payment.

7. The method for operating the sales device according to claim 1, wherein the at least one shelf with automatic removal monitoring for detecting the removed item performs the following:
   receiving a signal from at least two weighing cells arranged in corners of a rigid body forming a display area with at least two product areas, wherein the signals correspond to weight forces in an area of the corners of the rigid body;
   determining, with an evaluator, coordinates of a center of gravity and a total weight force from the received signals;
   receiving a signal corresponding to a new weight force of at least one of the weighing cells, and determining, with the evaluator, coordinates of the new center of gravity from the data currently received by the weighing cells;
   determining a product area, of the product areas, and a weight of the items removed from the determined product area; and
   determining the item data of the item removed from the shelf on the basis of the determined product area, and determining the number of items removed on the basis of the weight removed from the product area and a specific weight of the item.

8. The method for operating the sales device according to claim 4, wherein the method for object detection comprises comparing a measured weight value with the weight of at least one item on the list of items intended for payment.

9. The method for operating the sales device according to claim 1, the method further comprising:
   determining a total price for a payment transaction from a sum of all individual prices of the detected items for which the payment transaction is to be executed, and executing the payment transaction via a mobile payment method, a debit card, or credit card, or via a cash payment transaction.

10. A sales device for self-checkout of goods in a store, the store comprising at least one shelf with automatic removal monitoring and with a proximity sensor, and a network for exchanging data, the sales device comprising:
   a controller for controlling the sales device;
   a communication unit configured to receive the data from the network; and
   a database configured to store item data and object-describing attributes associated with the items,
   wherein the controller is configured to receive, via the network, from the at least one shelf with automatic removal monitoring, the item data of removed items and a customer identification number associated with the item data and read out by the proximity sensor,
   wherein the controller is configured to determine, from the item data, the customer identification number, and the read out of the proximity sensor, a list of the items intended for payment, and
   wherein the sales device comprises a detector having at least one sensor and an evaluator, wherein the detector is configured to use the evaluator to determine, on the basis of the data of the sensor and the list of the items intended for payment, for which items a payment transaction is to be executed,
   wherein the proximity sensor is configured to read out the customer identification number by detecting a shopping cart or shopping basket, wherein the shopping cart or shopping basket comprises a transmitter which is configured to be read out by the proximity sensor,
   wherein the shelf is configured to transmit a plurality of customer identification numbers to the controller upon the proximity sensor detecting a plurality of shopping carts, shopping baskets, or product scanners, and the controller is configured to store at least two of the customer identification numbers with the item data of the removed item in the list of items intended for payment, and
   wherein the proximity sensor is configured to detect a distance of each of the shopping carts, each of the shopping baskets or each of the product scanners to the proximity sensor and is configured to store the distance to the transmitter of the respective customer identification number in the list of items intended for payment upon associating the customer identification number with the item.

11. The sales device for self-checkout of goods according to claim 10, wherein the evaluator is configured to detect object-describing attributes from the data of the at least one sensor and to compare the object-describing attributes from the data with object-describing attributes of items that are on the list of items intended for payment.

12. A system comprising a group of a plurality of sales devices in the store, the plurality of sales devices comprising the sales device according to claim 10, wherein the database is a common database for all of the sales devices of the group of a plurality of sales devices, and the sales devices are connected to the database via a network.

13. The sales device for self-checkout of goods according to claim 10, wherein at least parts of the detector, the controller, the evaluator or the database are located outside the store, on a server or in a cloud network, and the sales device is configured to access these parts of the detector, the controller, the evaluator or the database via the network.

* * * * *